United States Patent [19]

Ohta

[11] Patent Number: 5,127,191
[45] Date of Patent: Jul. 7, 1992

[54] DOOR CONSTRUCTION OF AN AUTOMOBILE

[75] Inventor: Minoru Ohta, Hiroshima, Japan

[73] Assignee: Mazda Motor Corporation, Hiroshima, Japan

[21] Appl. No.: 262,027

[22] Filed: Oct. 25, 1988

[30] Foreign Application Priority Data

Oct. 26, 1987 [JP] Japan .................. 62-271446
Oct. 26, 1987 [JP] Japan .................. 62-271447

[51] Int. Cl.⁵ .................................. E05B 65/04
[52] U.S. Cl. ................................ 49/62; 49/502; 296/147
[58] Field of Search ............. 49/501, 502, 62; 296/147

[56] References Cited

FOREIGN PATENT DOCUMENTS 0597115 11/1925 France .................. 296/147
2236678 3/1975 France .................. 49/502
62-46218 3/1987 Japan .

Primary Examiner—Gerald A. Anderson
Attorney, Agent, or Firm—Wenderoth, Lind & Ponack

[57] ABSTRACT

A second door part is provided which is detachably mounted at the outside surface of a first door part which is openable and closable in relation to an automobile body. The second door part is engaged with the first door part by a locking mechanism. By operating the locking mechanism, redressing of the door by selectively attaching different types of second door parts can be carried out. Additionally, maintenance of mechanisms within the door can be easily performed. When it is desired to provide a window glass which can be raised and lowered for the second door part, a window glass raising/lowering mechanism having a lever arm is mounted to the first door part and a window glass is mounted to the second door part, a glass holder is fixed to a lower end of the window glass and the lever arm and the glass holder are engaged with each other. When the second door part is attached to and detached from the first door part, the lever arm and the glass holder are also disengaged from one another.

26 Claims, 9 Drawing Sheets

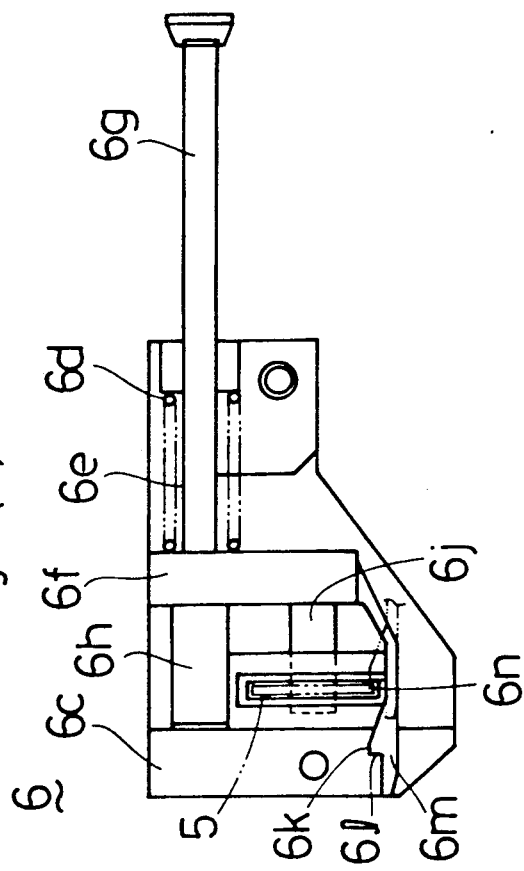
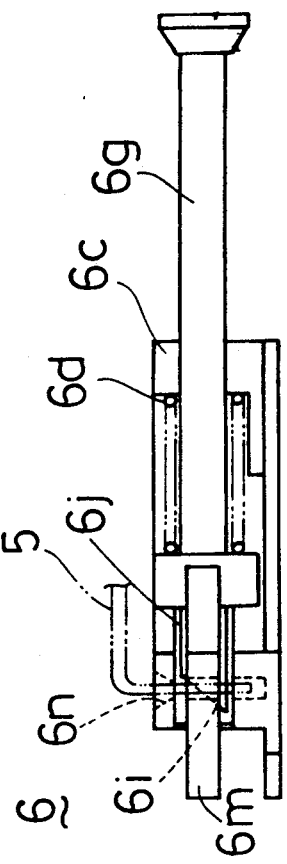
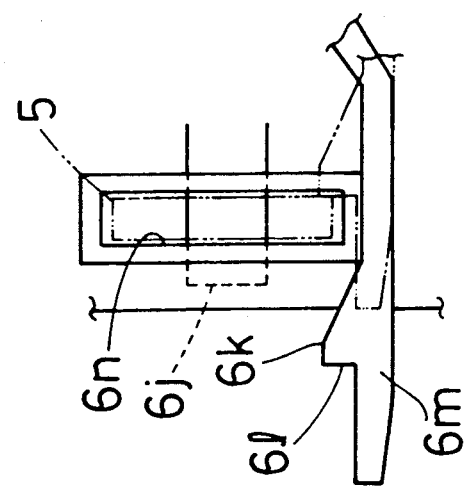
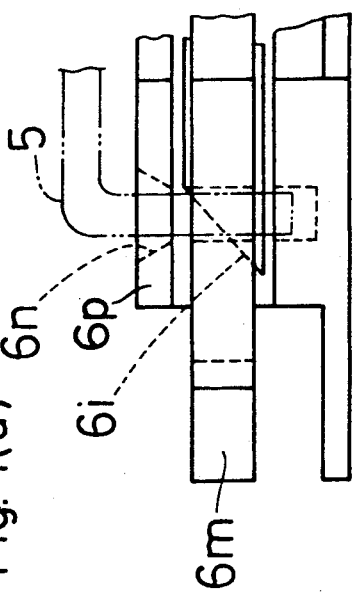
Fig. 4(a)
Fig. 4(b)
Fig. 4(c)
Fig. 4(d)

DOOR CONSTRUCTION OF AN AUTOMOBILE

BACKGROUND OF THE INVENTION

1. Field of the Invention

This invention relates to a construction for an automobile door which includes an inner member and an outer member and in which the outer member is interchangeable.

2. Description of the Prior Art

At present, automobiles are available with various body types. These body types are roughly classified into two types: open types with drivers' seats open to view; and closed types as represented by sedans, coupes, etc., which have the inside thereof isolated from the outside. Doors to be attached to automobile bodies vary in shape and construction depending on the type of automobile. For example, while doors of open type automobiles have low beltline levels (i.e. the top parts of the doors are low) and are generally without window glass, doors of closed type automobiles have higher beltline levels than the open type and are generally provided with window glass (refer to FIG. 8 and FIG. 9). Each door is mounted to a particular automobile body by means of hinges such that it can be swung between open and closed positions.

Each door includes an inner plate and an outer plate fastened together by an adhesive or the like so as to form a box-like shape. Such box-like shape is provided so as to accommodate a door locking mechanism, a mechanism for raising and lowering the window glass, etc. An example of such door construction is disclosed in Japanese Utility Model Registration Application Laid Open Publication No. 62-46218.

A recent tendency in automobile manufacturing which has been attracting public attention, is that of constructing automobiles with so-called "re-dressable" bodies, that is constructing automobile bodies with interchangeable outer plates. However, redressing of automobile doors having conventional construction is impossible because, in conventional construction, only one kind of door is applicable to one car body. That is, there has previously been no known door construction by which interchangeable doors can be provided. With conventional door construction, when, for example, the door locking mechanism, the mechanism for raising and lowering the window glass or a door latch becomes faulty, it is necessary to detach the inner plate of the door which is fixed to the outer plate. Detaching the inner plate from the outer plate, however, is complicated. Thus, it has been desired to improve the door construction to eliminate such complication.

SUMMARY OF THE INVENTION

An object of the present invention is to provide an automobile door which can be redressed and also to improve efficiency of maintenance work for mechanisms within the door by constructing the door with an inner door member and an outer door member which is detachably secured to the inner door member.

In order to attain the above object, according to the present invention a second door part (outer door member) is attached detachably to a first door part (inner door member) which is openable and closable in relation to an automobile body. A door opening and closing support mechanism is provided for linking the first door part to the car body and a locking means is provided for engaging the second door part with the first door part.

In this manner, at least the outer door member can be selectively changed.

Under the above construction according to the present invention, since the second door part is detachable in relation to the first door part by means of the locking means, various types of second door parts can be selectively interchanged so as to redress a single automobile body. Also, maintenance work for the door opening and closing mechanism and others mechanisms mounted to the first door part can be performed by only detaching the second door part from the first door part.

Another object of the present invention is to make an outer door member readily detachable, even in the case where it has a window glass which can be raised and lowered.

In order to attain this object, according to the present invention the second door part is attached to the outside surface of the first door part which is openable and closable in relation to the automobile body, a window glass raising/lowering mechanism having a lever arm is mounted to the first door part, a window glass which can be raised and lowered is mounted to the second door part, a glass holder is fixed to a lower end of the window glass and engaging parts are provided which are detachable from both the lever arm and the glass holder. Thereby, the window glass can be raised and lowered freely by the operation of the window glass raising/lowering mechanism when the engaging parts are engaged with both the lever arm and the glass holder.

With the above construction of the present invention, when the second door part is attached to the first door part, the engaging parts on the lever arm and the glass holder are also engaged with each other. In such engaged state, the window glass can be raised and lowered freely by the operation of the window glass raising/lowering mechanism. When the second door is detached, the engaging parts are released from engagement. Therefore, window glass is provided which can be raised and lowered smoothly, and the second door can be detached and attached easily.

BRIEF DESCRIPTION OF THE DRAWINGS

The accompanying drawings show a preferred embodiment of the present invention in which:

FIG. 4(a) is a front view of a rear locking means;

FIG. 4(b) is a bottom view of the rear locking means shown in FIG. 4(a);

FIG. 4(c) and FIG. 4(d) show an operational part, on an enlarged scale, of the rear locking means;

FIGS. 15(a) and 15(b) and 15(c) are horizontal sectional views of front and rear locking means, illustrating successive portions of an engaging and releasing operation therefor;

DETAILED DESCRIPTION OF THE PREFERRED EMBODIMENT

A description is made below of a preferred embodiment of the present invention, with reference to the accompanying drawings.

Figure 1:
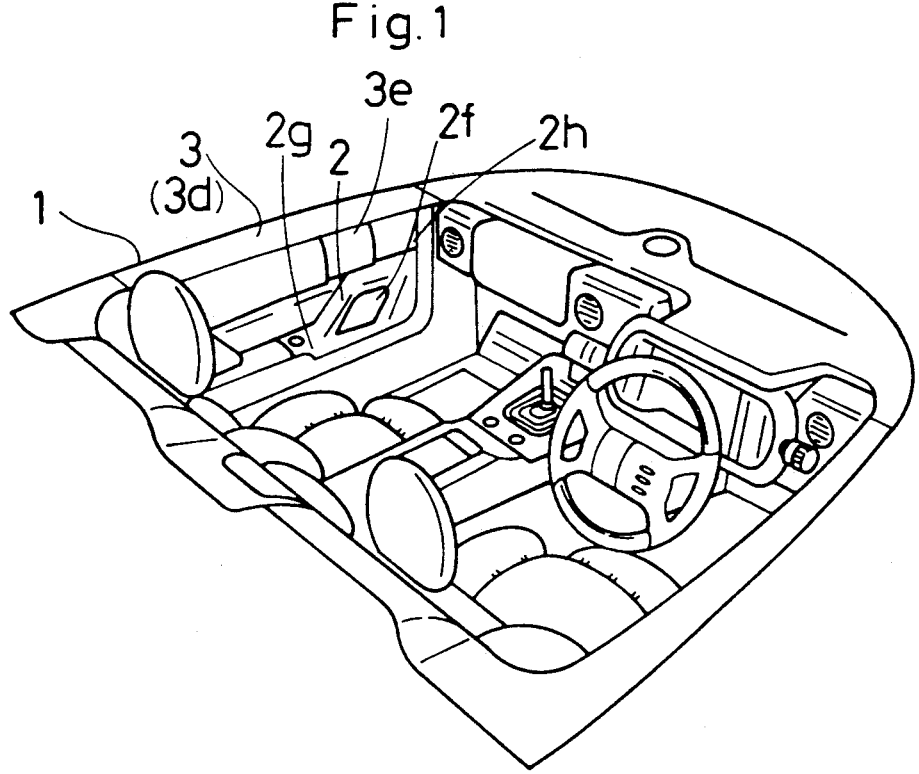
FIG. 1 is a perspective view, showing a layout of a part of the inside of an automobile with a door constructed in accordance with the present invention.
Figure 2:
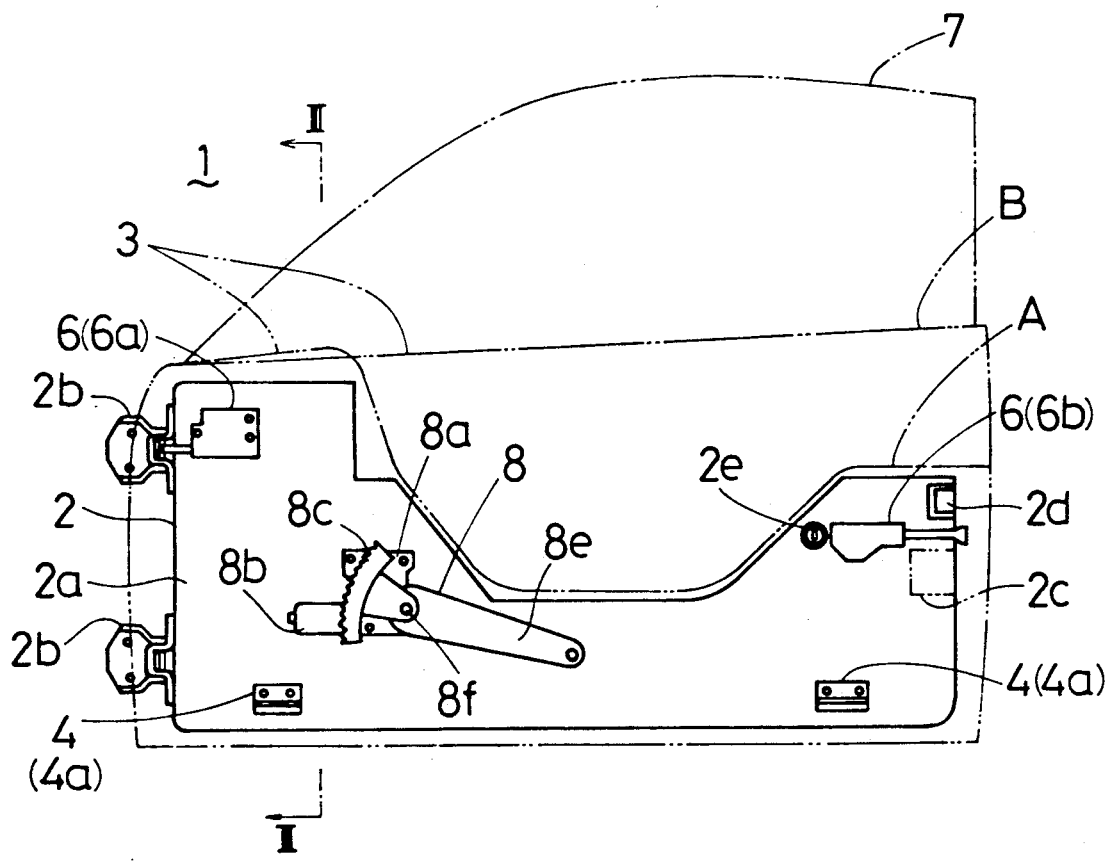
FIG. 2 is a side view of a first door part.

FIG. 1 shows an inside layout of an automobile having a door constructed in accordance with the present invention. As shown in FIG. 2, the door includes a door engaging hinge 4 for hingedly connecting a second door part (outer door member) 3 with a first door part (inner door member) 2, a locking means 6 in which a fastening piece 5 projecting from the inside surface of the second door part 3 is inserted and locked, and a window raising/lowering mechanism 8.

As shown in FIG. 2, the first door part 2 is provided with a door frame 2a which is made of carbon fiber and formed into a box shape having a concave shape at the central upper part of each side thereof. Two second door part engaging members 4a are arranged at the lower part of the outside of the door frame 2a. A locking means 6 is provided and comprises a front 6a and a rear 6b locking means, both of which are attached to the upper part of the door frame 2a. Two different types 3A and 3B (types A and B, respectively) of the second door part 3 can be attached to the first door part 2 as shown by chain lines in FIG. 2 (the A type second door part 3A has no window glass and the B type second door part 3B has window glass). A front part of the door frame 2a is hinged to the car body by means of hinges 2b. A conventional door opening and closing support mechanism equipped with a door locking device 2c is provided at the rear part of the door frame 2a.

Figure 3:
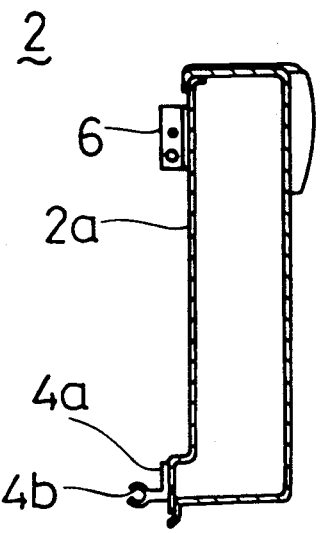
FIG. 3 is a cross sectional view, taken along line III—III in FIG. 2.

One of the second door part engaging members 4a is shown in FIG. 3 as being an L-shaped member having a substantially C-shaped part at one end thereof. This L-shaped member is mounted to the door frame 2a in such a fashion that a notch 4b of the C-shaped part opens in the direction in which it forms a right angle with the outside of the first door part 2. A fastening plate 4c of the second door part (to be explained later) is fastened to the C-shaped part to thereby form the door engaging hinge 4.

The locking means 6 is shown in FIG. 2 and FIG. 4. FIG. 4(a) shows a front view and FIG. 4(b) shows a bottom view. FIG. 4(c) and FIG. 4(d) show a part of the locking means, on an enlarged scale. Referring to the rear locking means 6b, a main body 6c is fixed to the outside surface of the door frame 2a of the first door part 2 and a lock sliding part 6e which is imparted with a pressing force in a locking direction (left direction in FIG. 4) by a compression spring 6d is provided in the rear locking means 6b.

A forward end of the lock sliding part 6e is joined with a sliding part base 6f which is subjected to the pressing force of the compression spring 6d. A rear end of the lock sliding part 6e extends rearwardly of the door (in the right direction in FIG. 4) and projects from a main body 6c to form a knob 6g. Provided in the locking means 6 are a cylindrical lock plunger 6h which makes contact with the main body 6c when the locking means is in a locked position (the position shown in FIG. 4), an engaging rod 6j which is mounted below the lock plunger 6h and has an inclined plane 6i at a forward end thereof, and a lock releasing member 6m which extends from the undersurface of the sliding part base 6f toward the front of the door. The lock releasing member 6m is formed with an inclined part 6k and a shoulder part 6q near the forward end thereof. A rectangular fastening hole 6n is formed through a part 6p which is disposed outside of the lock releasing member 6m in the transverse direction of the automobile and faces the engaging rod 6j, the knob 6g. The lock sliding part 6e, the sliding part base 6f, the knob 6g, the lock plunger 6h, the engaging rod 6j and the lock releasing member 6m are operatively connected together such that they operate simultaneously. FIG. 5(b) shows the state in which the fastening piece 5 projecting from the second door part 3 is inserted through the fastening hole 6n. Although the foregoing explanation refers to the rear locking means 6b, the construction of the front locking means 6a is the same except that the knob 6g is projected forwardly of the door. The operation of the locking means 6 is explained later.

Figure 5:
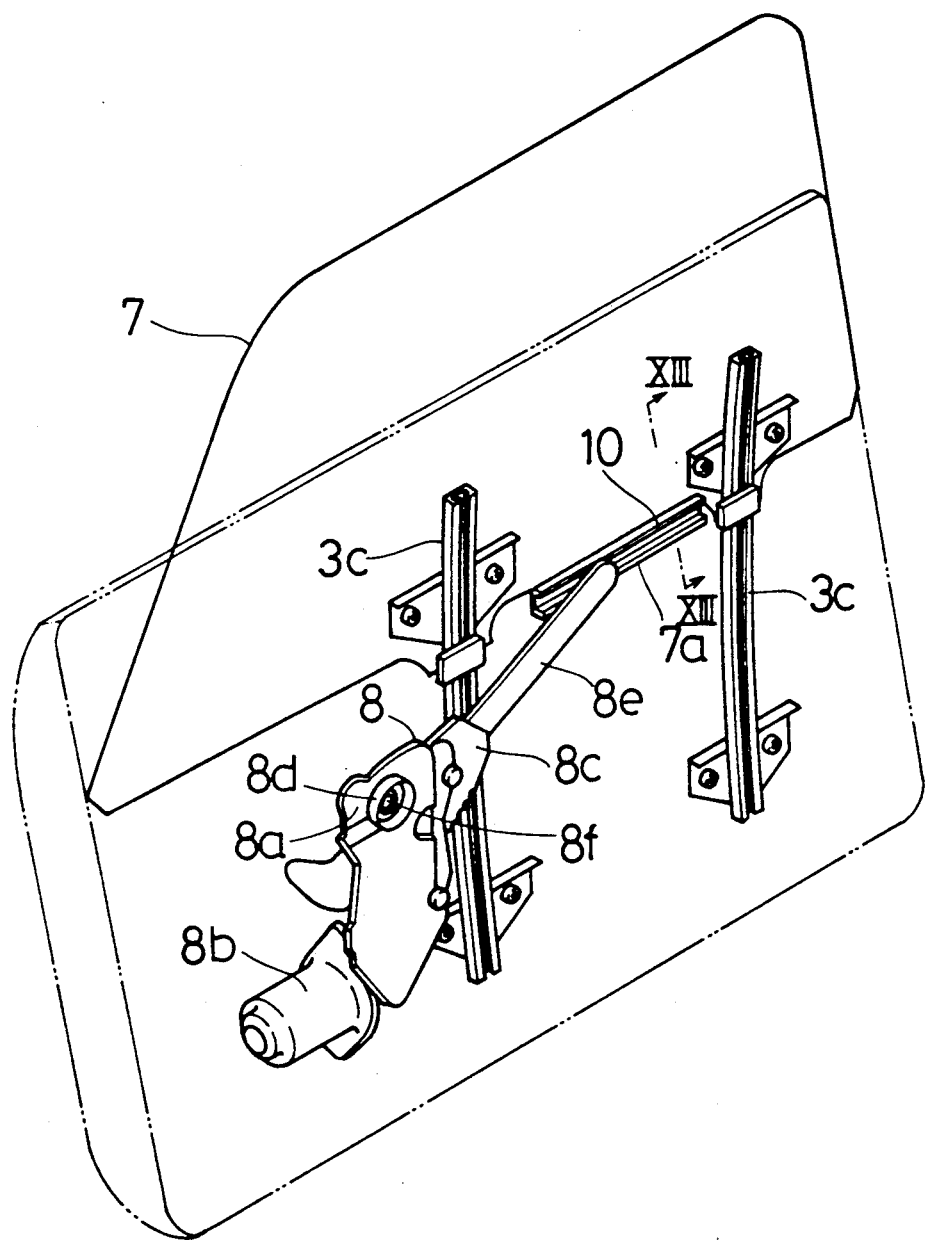
FIG. 5 is a perspective view, showing the inside construction of the door in which a window glass and a window raising/lowering mechanism are engaged with each other.
Figure 6:
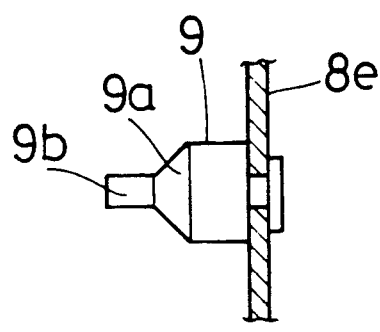
FIG. 6 is a cross sectional view of an engaging projection on an enlarged scale.

As shown in FIG. 2 and FIG. 5, the window glass raising/lower mechanism 8 is of the power window type and is attached to the outside surface of the first door part 2. It is a conventional mechanism having a reversible motor 8b, a sector gear 8c, a balancing spring 8d and a lever arm 8e mounted to a base plate 8a which is connected to the first door part 2. The sector gear 8c to which a driving force of the reversible motor 8b is transmitted is operable to rock the lever arm 8e. The balancing spring 8d is wound around a rocking shaft 8f. When the window glass 7 provided at the side of the second door part 3B is raised and lowered, the balancing spring 8d creates an upwardly directed biasing force against the window glass 7 so that the window glass may not be caused to lower by the force of its own weight. As shown in FIG. 6, an engaging projection 9 which projects toward the second door part 3 is provided at a forward end of the lever arm 8e. This projection 9 is made of hard rubber and includes an inclined part 9a and small diameter engaging part 9b.

Figure 7:
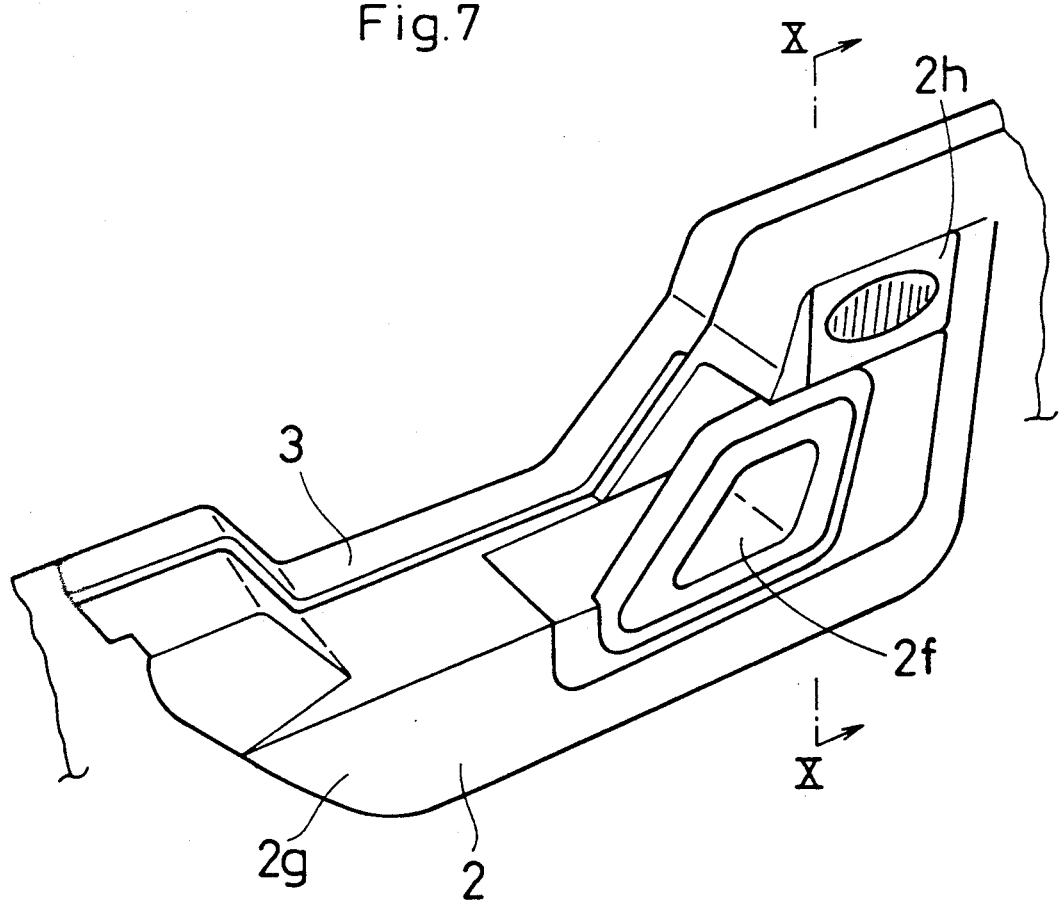
FIG. 7 is a perspective view of the inside surface of the door, showing a first type (A type) of a second door part engaged and locked with the first door part.

As shown in FIG. 2, an outer handle 2d, a key cylinder 2e and other conventional elements are provided at the outside surface of the first door part 2. Provided on the inside thereof are, as shown in FIG. 1 and FIG. 7, an inner handle 2f, a lower trim 2g, a front speaker 2h, etc. Additionally, elements for opening, closing and locking the window and for raising and lowering the window glass are provided on the first door part 2.

An explanation of the manner in which the second door part 3 is attached and detached to the first door part 2 is provided below.

Figure 8:
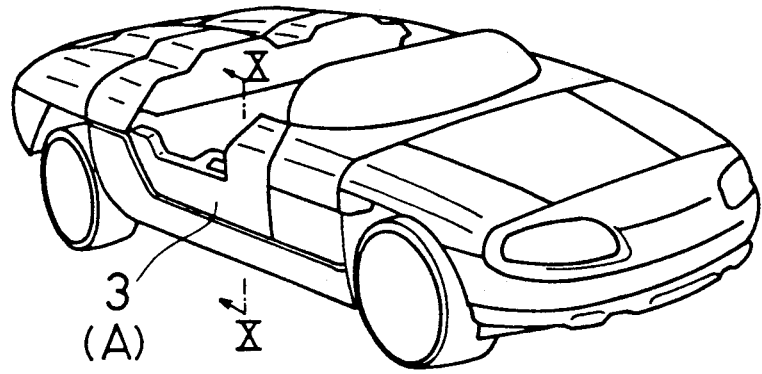
FIG. 8 is a perspective view of an open type automobile equipped with the door part shown in FIG. 7.
Figure 9:
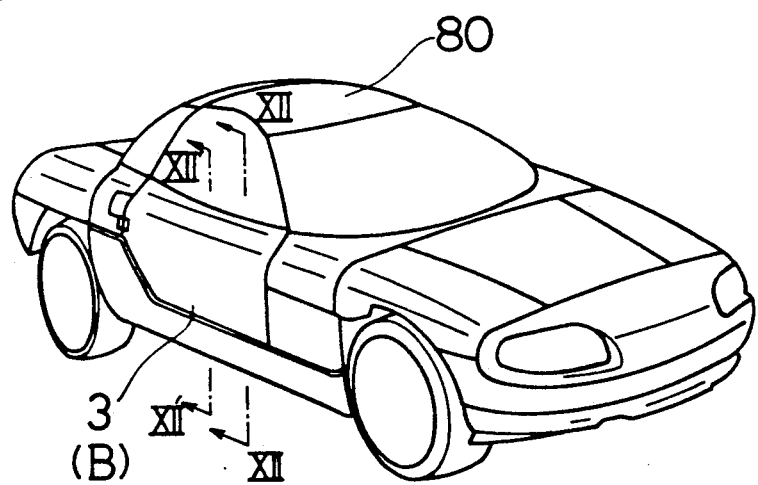
FIG. 9 is a perspective view of a coupe type automobile equipped with a second type (B type) of the second door part.

The second door part 3 is engaged with and locked to the first door part 2 by the hinge 4 and the locking means 6. As mentioned before, the second door part 3 is available in two types, i.e., type A (second door part 3A) for use with an open type automobile body, as shown in FIG. 8 and type B (second door part 3B) for use with a coupe type automobile body as shown in FIG. 9. The two types 3A, 3B of the second door part 3 are interchangeable for use with the applicable car body. The construction of the second door part 3 is described below.

Figure 10:
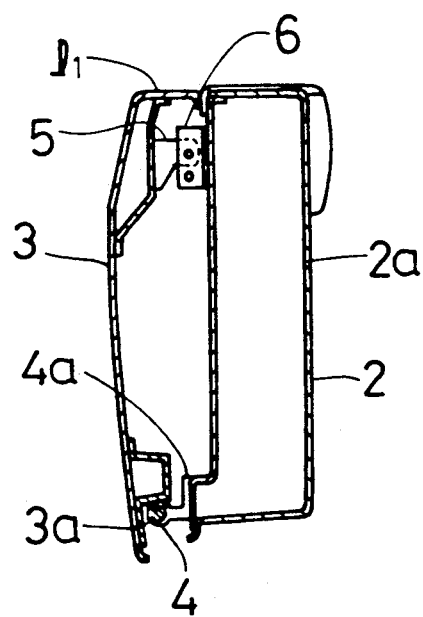
FIG. 10 is a cross sectional view, taken along the line X—X in FIG. 8.
Figure 11:
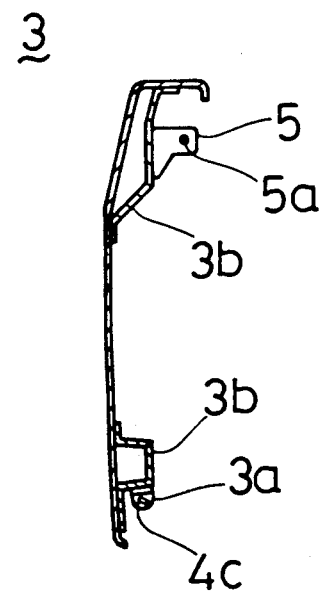
FIG. 11 is a longitudinal sectional view of the A type second door part.

As shown in FIG. 10 and FIG. 11, a beltline (or upper contour) Q1 of the second door part 3A is at a relatively low level about the same height as the top of the door frame 2a. The second door part 3A is formed in the shape of a panel. Fastening parts 3a are provided at a lower part of the inside surface of the second door 3A and at positions corresponding to the engaging members 4a of the first door 2. Two fastening pieces are mounted at the upper part of the inside surface of the second door 3A at positions corresponding to the front 6a and rear 6b locking means.

The fastening parts 3a project from the undersurface of a reinforcing member 3b which is fixed to the inner surface of the second door part 3A and carrier fastening plates 4c mounted at an angle of about 45° relative to the inner surface of the second door 3A. The fastening pieces 5 project from the side surface of the reinforcing member 3b which is fixed to the inner surface of the second door part 3A. Each of the fastening pieces 5 has a fastening hole 5a therein.

Figure 13:
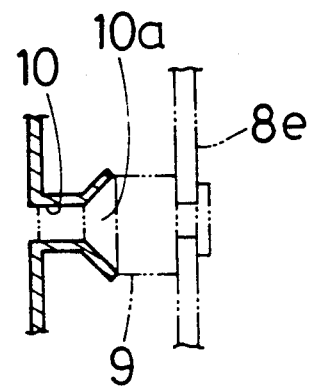
FIG. 13 is a cross sectional view taken along the line XIII-XIII in FIG. 5.
Figure 12A:
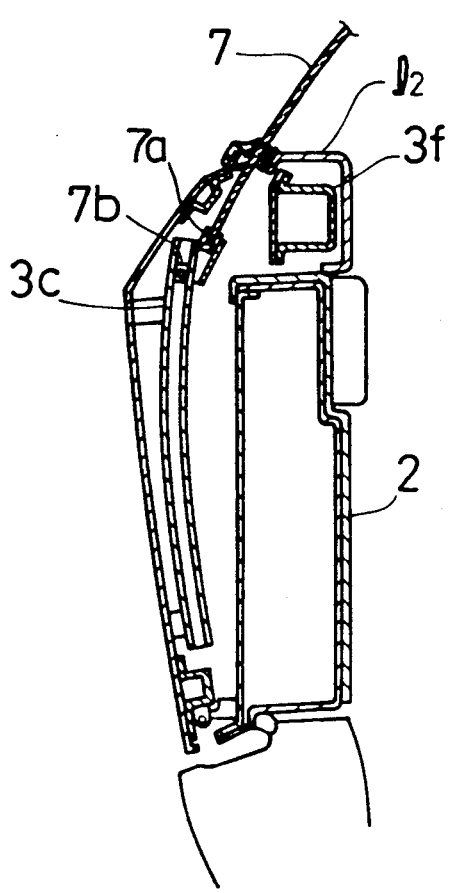
FIG. 12(a) is a cross sectional view taken along the line XII—XII in FIG. 9.
Figure 12B:
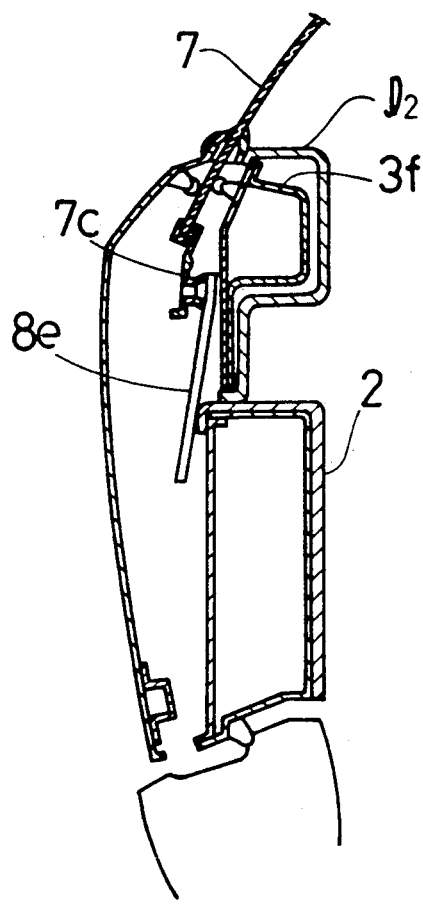
FIG. 12(b) is a cross sectional view taken along the line XII'—XII' in FIG. 9.
Figure 16B:
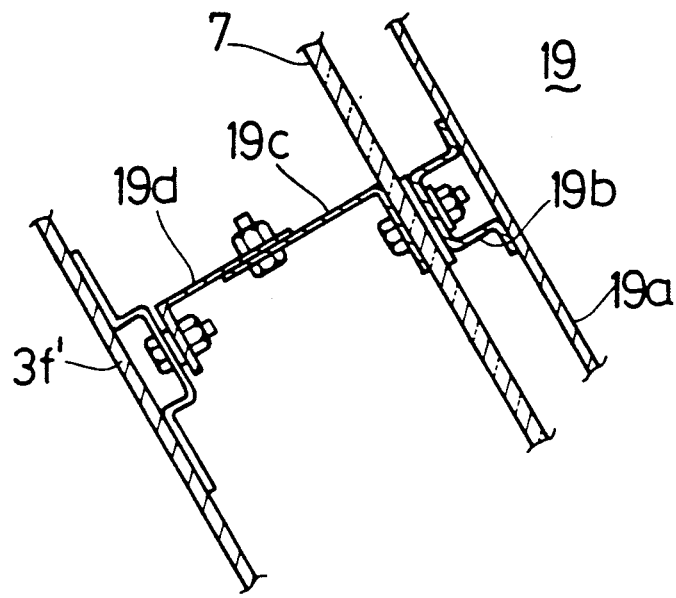
FIG. 16(b) is a cross sectional view, taken along the line XVI—XVI in FIG. 16(a).
Figure 16A:
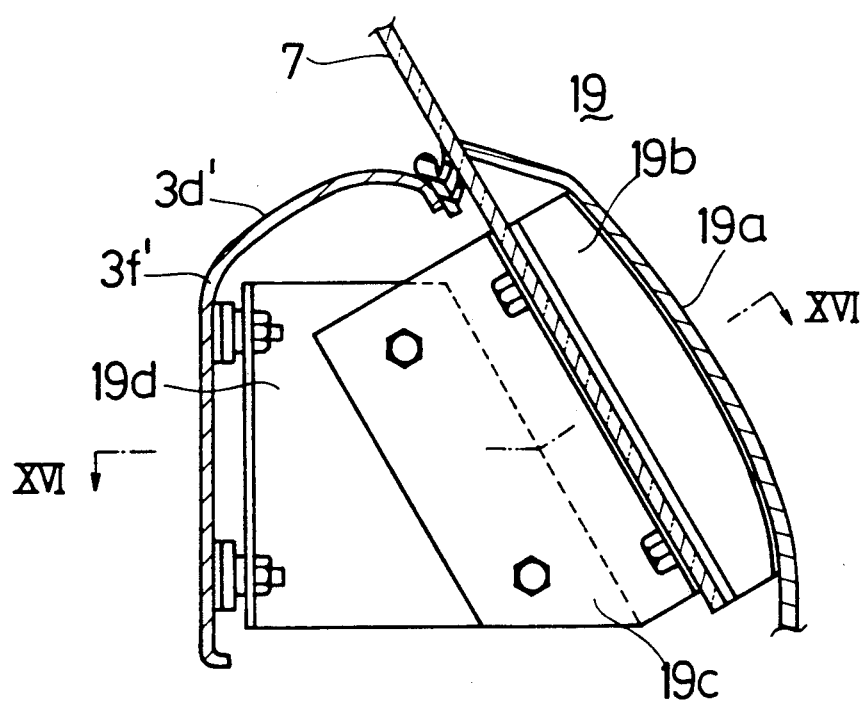
FIG. 16(a) is a cross sectional view of a window glass fixing part, on an enlarged scale, of a modified form of the B type second door part.

As shown in FIGS. 12(a) and (b), the second door part 3B has a beltline Q2 which is higher in level than that of the second door part 3A and also has the window glass 7, mounted thereto. The window glass 7 is of a conventional construction. In particular, as shown in FIG. 5 and FIG. 2, it is fixed to a glass holder 7a at a substantially central lower end thereof. Guide rollers 7b are connected to the glass 7 and are rollable in guide rails 3c attached at two locations to the inside surface of the second door part 3B. The glass holder 7a is formed with a substantially rectangular engaging groove 10 and the engaging projection 9 provided at a forward end portion of the lever arm 8e is inserted in the groove 10 for slidable engagement therewith. The engaging groove 10 has an inclined opening 10a, as shown by the detailed cross sectional view of FIG. 13. The inclined opening 10a corresponds with the inclined part 9a of the engaging projection 9. The engaging pieces 5, the fastening plates 4c and the engaging members 4a for connecting the second door part 3B to the first door part 2 are similar to those for connecting the second door part 3A to the first door part 2. An upper side trim 3d, a rear speaker 3e, etc. are connected to the first door part 2 at an upper part of the inner surface thereof, as shown in FIGS. 1 and 16(a). A frame 3f for reinforcing purposes is provided for the upper side trim 3d.

An explanation is provided below in connection with attachment and detachment of the second door part 3 to and from the first door part 2. Since the attaching and detaching operation is substantially the same for the second door parts 3A and 3B, an explanation is provided only for attaching and detaching the second door part 3B, as shown in FIG. 14.

Figure 14:
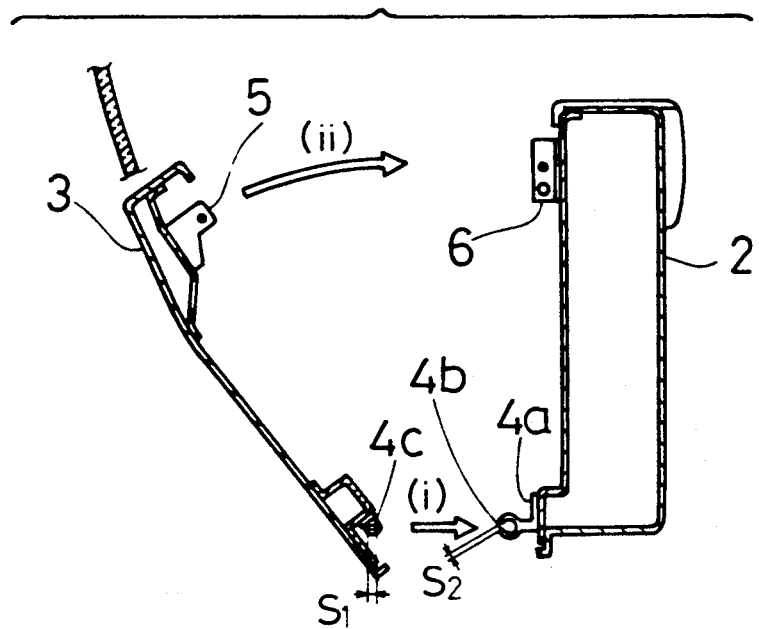
FIG. 14 is a longitudinal sectional view illustrating an engaging and locking operation of the B type second door part.

As shown in FIG. 14, in order to engage and lock the second door part 3B with the first door part 2, the second door part 3B is first disposed at an angle of about 45° relative to the first door 2 so that the fastening plates 4C are at right angles relative to the first door part 2 and are aligned with the notches 4b of the engaging members 4a. The fastening plates 4c are then inserted into the notches 4b (as shown by arrow i in FIG. 14). By this insertion, the engaging hinge 4 is formed and the second door part 3B is rotatably connected to the first door part 2. By rotating the second door part 3B toward the first door part 2 with the engaging hinge 4 as a pivot point (see arrow ii in FIG. 14), each of the fastening pieces 5 of the second door part 3B is inserted into a respective fastening hole 6n formed through the part 6p of the main body 6c of the front 6a and rear 6b locking means. Since each of the locking means 6a, 6b is attached to the first door part 2, the second door part 3B is engaged with and locked to the first door part 2 accurately by the engagement of the locking means 6 with the fastening pieces 5.

Figure 15A:
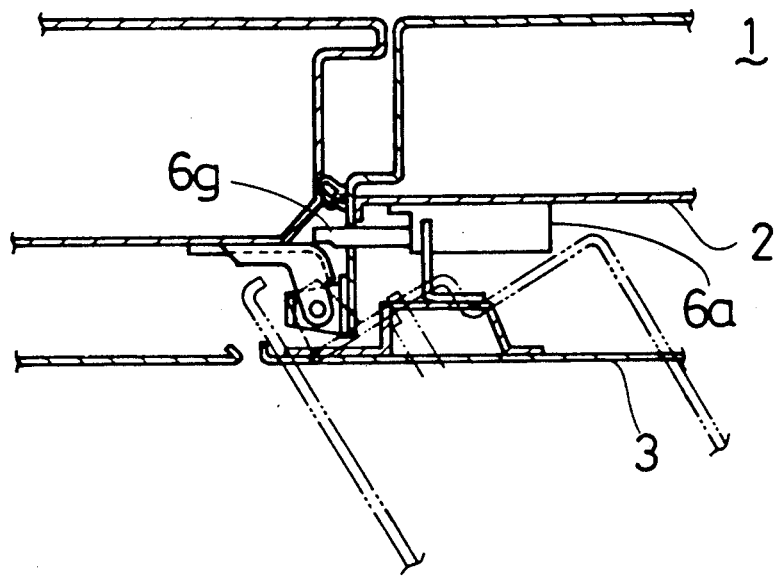
Figure 15B:
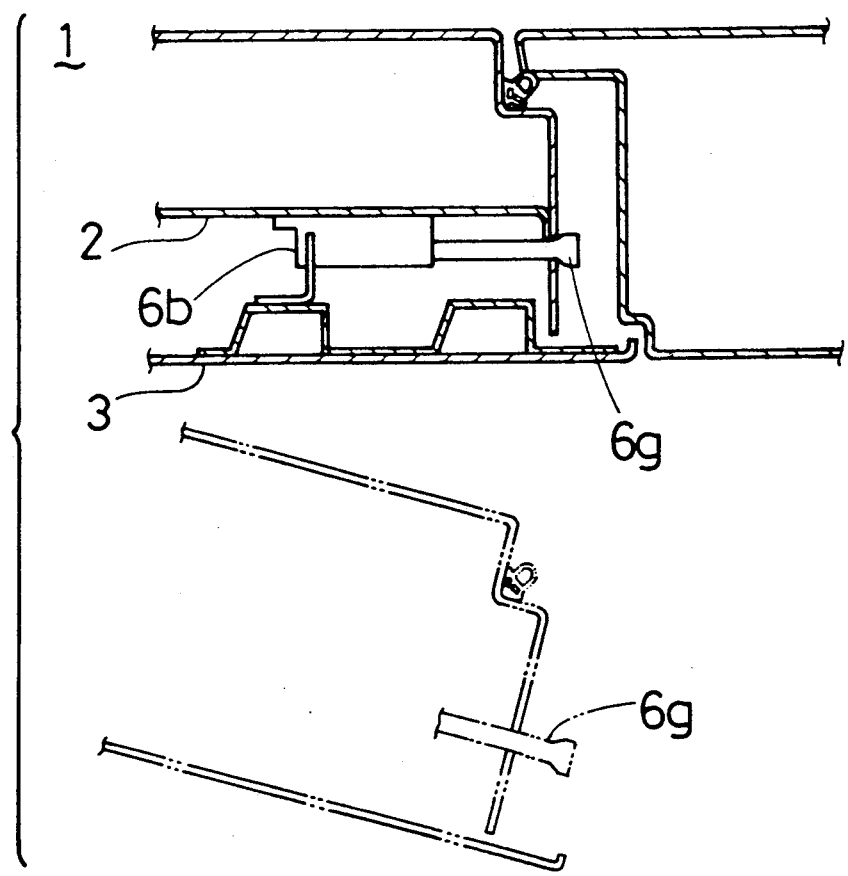

The locking operation of one of the locking means 6 will now be described. As shown by arrow ii in FIG. 14, the fastening pieces 5 mounted to the second door part 3B, which is hinged to the first door part 2, is inserted in the fastening hole 6n of the locking means 6 as shown in FIG. 4. An end portion of the fastening piece 5 makes contact with an inclined plane 6i of the engaging rod 6j and presses against it to force it in the lock releasing direction (in the right direction in FIG. 4). Then, when the fastening piece 5 is inserted into the locking position (the position shown in FIG. 4(b)), the engaging rod 6j is inserted in the fastening hole 5a formed in the fastening piece (see FIG. 11) due to the bias force of the compression spring 6d. In this manner, the second door part 3B is engaged with and locked to the first door part 2. Since the width S1 of the fastening plate 4c is larger than the width S2 of the notch 4b of the second door engaging member 4a, the fastening plate 4c will not disengage from the notch 4b (refer to FIG. 14). As the knob 6g of each of the locking means 6a, 6b is projected from the front and the rear of the first door part 2, respectively, when the door is closed (as shown by solid lines in FIG. 15) operation of the locking means from the outside is made impossible due to the outer plate of the automobile body being disposed in front of the locking means 6a and to the rear of the locking means 6b. In addition, in regard to the rear locking means 6b, since the locking means is released by pulling the knob 6g rearwardly, even if the knob 6g is pressed inwardly toward the first door part 2 in the event of a car crash, for example, the locking means is not released and the second door part 3B is prevented from becoming inadvertently disengaged from the first door part 2.

With the above-described attachment of the second door part 3B to the first door part 2 (recall that window glass is not provided with the second door part 3A), the engaging projection 9 provided at a forward end of the lever arm 8e is inserted in and engaged with the engaging groove 10 of the glass holder 7a which is provided at a lower and of the window glass 7. As shown in FIG. 5, the window glass raising/lowering mechanism 8 and the window glass 7 are connected with each other such that the window glass 7 can be raised and lowered by the operation of the window glass raising/lowering mechanism 8.

In order for the second door part 3B to be detached from the first door part 2, the window glass 7 is lowered to its lowermost position so that the engaging projection 9 does not disengage from the engaging groove 10 for reattaching of the second door part 3B to the first door part 2. The door 1 is moved to an open state (chain line in FIG. 15) such that each knob 6g of the locking means 6 can be operated. Each of the locking means is released by moving the knob 6g of the engaging rod 6j of the rear locking means 6b (although FIG. 4 shows only the arrangement of the locking means in which it is released by pulling of the knob 6g, it will be readily understood by those skilled in the art that the locking means can be arranged so as to be releasable by pushing of the knob 6g). The second door part 3B is then removed by reversing the operation used to attach it to the first door part 2. That is, the second door part 3B is pivoted outwardly of the automobile body about the engaging hinge 4 until the fastening plates 4c are at a right angle to the outside surface of the first door part 2 (i.e. the position where the second door part is inclined about 45° relative to the first door part). The fastening plates 4c can then be readily removed from the door engaging members 4a so as to detach the second door part 3B from the first door part 2.

The unlocking operation of one of the locking means 6 will now be explained with reference to FIG. 4. By operating the knob 6g, the engaging rod 6j is moved in the lock releasing direction. With this movement of the engaging rod 6j, the locking releasing member 6m also moves in the lock releasing direction such that its inclined part 6k presses the fastening piece 5 upward as shown in FIGS. 4(a) and 4(c) and then moves beyond the fastening piece 5 and into the lock releasing position (chain line in FIG. 4(a)). The fastening piece 5 is then caused to engage with the shoulder part 6Q because the lock releasing member 6m is biased toward the locking direction by the compression spring 6d. In this condition, the lock releasing member 6m is prevented from returning to the locked position, thereby preventing the engaging rod 6j from being inserted into the fastening hole 5a and allowing the fastening piece 5 to be freely detached from the locking means 6. Thus, the second door part 3B can be detached from the first door part 2.

As the second door part 3B is detached from the first door part 2, the engaging projection 9 of the lever arm 8e is detached from the engaging groove 10 of the glass holder 7a so as to detach the window glass raising/lower mechanism 8 from the first door part 2.

In regard to the second door part 3A, removal thereof from the first door part 2 is identical to the above described removal of the second door part 3B from the first door part 2, except that window glass is not provided with the second door part 3A, and thus, the steps regarding manipulation of the window glass 7 or the window glass raising/lowering mechanism 8 are omitted.

As stated above, the door construction according to the present invention is such that it allows re-dressing of the door by selectively attaching different types of second door parts to the first door part. Also, the window glass and the window glass raising/lowering mechanism are engaged with each other upon attaching of the second door part to the first door part such that when it is necessary to perform maintenance work on the window glass raising/lowering mechanism (or other devices mounted to the first door part such as a door opening and closing mechanism), it is only necessary to detach the second door part from the first door part in order to perform such maintenance. As a result, working efficiency is improved.

The automobile in the present embodiment is of such construction that when it is originally provided with the second door part 3B attached to the first door part 2 and a roof panel 80, as shown in FIG. 9, the roof panel 80 can be detached by removing bolts, removing the second door part 3B and attaching the second door part 3A in order to change the automobile into an open type automobile as shown in FIG. 8. Conversely, if the automobile is originally provided with the second door part 3A attached to the first door part 2, the automobile can be easily redressed by removing the second door part 3A, attaching the second door part 3B and attaching the roof panel 80.

In the present embodiment, a power window type window glass raising/lowering mechanism is provided as shown in FIG. 5. However, the present invention is not limited to such a window glass raising/lowering mechanism and can alternatively be provided with a manual window type window glass raising/lowering mechanism such as one having a driving force transmitting mechanism of the parallel type, the wire type or tape type.

Regarding the second door part 3B, a modification thereto is described below with reference to FIG. 16. In the door of this embodiment the window glass 7 is fixed to the door outer plate. More particularly, as shown in FIG. 16(b), the window glass 7 is fastened between a bracket 19b welded to a second door outer plate 19d and a first L-shaped bracket 19c by means of bolts. A second bracket 19d is fastened to a frame 3f of an upper side trim 3d' by bolts, and adjoining ends of the first and the second L-shaped brackets 19c, 19d are fastened together with bolts. Thus, the window glass 7 is fixed to the second door part. This construction is such that the brackets 19c, 19d act to reinforce the upper part of the second door part. When the second door part 3B is attached to the first door part 2, engagement and locking are carried out in the same manner as previously described. In this modified form of the second door part 3B, the window glass is fixed and therefor a window glass raising/lowering mechanism for the first door is not necessary. The weight of the door is thereby reduced.

I claim:

1. An automobile door assembly for a coupe type or an open type automobile, comprising:
    an inner door member adapted to be hingedly mounted to an automobile body;
    an interchangeable outer door member detachably mounted to said inner door member;
    said interchangeable outer door member including a first type of outer door member having a first predetermined shape and being adapted to be detachably mounted to said inner door member, and a second type of outer door member having a second predetermined shape different than said first predetermined shape and being adapted to be detachably mounted to said inner door member; and
    securing means for securing either one of said first and second types of outer door members to said inner door member.

2. An automobile door assembly as recited in claim 1, wherein said second type of outer door member has a beltline which is substantially lower than a beltline of said first type of outer door member.

3. An automobile door assembly for a coupe type or an open type automobile, comprising:
an inner door member adapted to be hingedly mounted to an automobile body;
an interchangeable outer door member detachably mounted to said inner door member;
said interchangeable outer door member including a first type of outer door member adapted to be detachably mounted to said inner door member, a second type of outer door member, different than said first type of outer door member, adapted to be detachably mounted to said inner door member;
securing means for securing either one of said first and second types of outer door members to said inner door member; and
wherein said first type of outer door member has a window glass at an upper portion thereof, and said second type of outer door member has no window glass.

4. An automobile door assembly comprising:
an inner door member adapted to be hingedly mounted to an automobile body;
a first type of outer door member having a first predetermined shape and being adapted to be detachably mounted to said inner door member;
a second type of outer door member having a second predetermined shape different than said first predetermined shape and being adapted to be detachably mounted to said inner door member; and
securing means for securing either one of said first and second types of outer door members to said inner door member.

5. An automobile door assembly as recited in claim 4, wherein
said second type of outer door member has a beltline which is substantially lower than a beltline of said first type of outer door member.

6. An automobile door assembly as recited in claim 4, wherein
neither of said inner door member and said second type of outer door member has a window glass mounted thereto.

7. An automobile door assembly as recited in claim 6, wherein
said securing means comprises:
hinge means, for pivotally mounting either one of said first and second types of outer door members to said inner door member; and
locking means for locking either one of said first and second types of outer door members against pivotal movement relative to said inner door member.

8. An automobile door assembly as recited in claim 7, wherein
said hinge means comprises two engaging members mounted to said inner door member in spaced apart relation at a lower portion thereof, and a pair of fastening parts mounted to each of said first and second types of outer door members in spaced apart relation at a lower portions thereof.

9. An automobile door assembly as recited in claim 8, wherein
said locking means comprises two fastening pieces mounted to each of said first and second types of outer door members in spaced apart relation at upper portions thereof, and two locking members mounted to said inner door member in spaced apart relation at an upper portion thereof.

10. An automobile door assembly as recited in claim 8, wherein
each of said engaging members comprises an L-shaped member having a C-shaped part at one end thereof, said C-shaped part having a notch therein opening away from said inner door member.

11. An automobile door assembly as recited in claim 4, further comprising
a window glass mounted to an upper portion of said first type of outer door member.

12. An automobile door assembly as recited in claim 11, wherein
said securing means comprises:
hinge means, for pivotally mounting either one of said first and second types of outer door members to said inner door member; and
locking means for locking either one of said first and second types of outer door members against pivotal movement relative to said inner door member.

13. An automobile door assembly as recited in claim 12, wherein
said hinge means comprises two engaging members mounted to said inner door member in spaced apart relation at a lower portion thereof, and a pair of fastening parts mounted to each of said first and second types of outer door members in spaced apart relation at a lower portions thereof.

14. An automobile door assembly as recited in claim 13, wherein
said locking means comprises two fastening pieces mounted to each of said first and second types of outer door members in spaced apart relation at upper portions thereof, and two locking members mounted to said inner door member in spaced apart relation at an upper portion thereof.

15. An automobile door assembly as recited in claim 13, wherein
each of said engaging members comprises an L-shaped member having a C-shaped part at one end thereof, said C-shaped part having a notch therein opening away from said inner door member.

16. An automobile door assembly as recited in claim 11, further comprising
a window glass raising/lowering means, adapted to be mounted to said inner door member and to be operably connected to said window glass, for raising and lowering said window glass.

17. An automobile door assembly as recited in claim 11, wherein
said inner door member has a beltline which is substantially lower than a beltline of said interchangeable outer door member.

18. An automobile door assembly as recited in claim 17, wherein
said securing means comprises:
hinge means, for pivotally mounting either one of said first and second types of outer door members to said inner door member; and
locking means for locking either one of said first and second types of outer door members against pivotal movement relative to said inner door member.

19. An automobile door assembly comprising:
an inner door member adapted to be hingedly mounted to an automobile body;
a first type of outer door member adapted to be detachably mounted to said inner door member;

a second type of outer door member, different than said first type of outer door member, adapted to be detachably mounted to said inner door member; and securing means for securing either one of said first and second types of outer door members to said inner door member;

a window glass mounted to an upper portion of said first type of outer door member;

wherein said securing means comprises hinge means for pivotally mounting either one of said first and second types of outer door members to said inner door member, and locking means for locking either one of said first and second types of outer door members against pivotal movement relative to said inner door member;

wherein said hinge means comprises two engaging members mounted to said inner door member in spaced apart relation at a lower portion thereof, and a pair of fastening parts mounted to each of said first and second types of outer door members in spaced apart relation at lower portions thereof;

wherein each of said engaging members comprises an L-shaped member having a C-shaped part at one end thereof, said C-shaped part having a notch therein opening away from said inner door member; and wherein each of said fastening parts comprises a fastening plate mounted respectively to one of said first and second types of outer door members at an angle thereto such that said first and second types of outer door members must be angled relative to said inner door member in order to engage said fastening plates in said notches of said C-shaped parts of said engaging members, respectively.

20. A redressable automobile door comprising:

an inner door member adapted to be hingedly mounted to an automobile body;

a first type of outer door member adapted to be detachably mounted to said inner door member;

a second type of outer door member, different than said first type of outer door member, adapted to be detachably mounted to said inner door member; and securing means for securing either one of said first and second types of outer door members to said inner door member;

a window glass mounted to an upper portion of said first type of outer door member;

wherein said securing means comprises hinge means for pivotally mounting either one of said first and second types of outer door members to said inner door member, and locking means for locking either one of said first and second types of outer door members against pivotal movement relative to said inner door member; and wherein said locking means comprises two fastening pieces mounted in spaced apart relation at an upper portion of each of said first and second types of outer door members, each of said fastening pieces extending away from said first and second types of outer door members, respectively, and two locking members mounted to said inner door member, each of said locking members including an engaging rod spring biased toward an engaging position in which it securely detachably retains one of said fastening pieces.

21. An automobile door assembly comprising:

an inner door member adapted to be hingedly mounted to an automobile body;

a first type of outer door member adapted to be detachably mounted to said inner door member;

a second type of outer door member, different than said first type of outer door member, adapted to be detachably mounted to said inner door member; and securing means for securing either one of said first and second types of outer door members to said inner door member;

wherein neither of said inner door member and said second type of outer door member has a window glass mounted thereto;

wherein said securing means comprises hinge means for pivotally mounting either one of said first and second types of outer door members to said inner door member, and locking means for locking either one of said first and second types of outer door members against pivotal movement relative to said inner door member;

wherein said hinge means comprises two engaging members mounted to said inner door member in spaced apart relation at a lower portion thereof, and a pair of fastening parts mounted to each of said first and second types of outer door members in spaced apart relation at a lower portions thereof;

wherein each of said engaging members comprises an L-shaped member having a C-shaped part at one end thereof, said C-shaped part having a notch therein opening away from said inner door member; and wherein each of said fastening parts comprises a fastening plate mounted respectively to one of said first and second types of outer door members at an angle thereto such that said first and second types of outer door members must be angled relative to said inner door member in order to engage said fastening plates in said notches of said C-shaped parts of said engaging members, respectively.

22. A redressable automobile door comprising:

an inner door member adapted to be hingedly mounted to an automobile body;

a first type of outer door member adapted to be detachably mounted to said inner door member;

a second type of outer door member, different than said first type of outer door member, adapted to be detachably mounted to said inner door member; and securing means for securing either one of said first and second types of outer door members to said inner door member;

wherein neither of said inner door member and said second type of outer door member has a window glass mounted thereto;

wherein said securing means comprises hinge means for pivotally mounting either one of said first and second types of outer door members to said inner door member, and locking means for locking either one of said first and second types of outer door members against pivotal movement relative to said inner door member; and wherein said locking means comprises two fastening pieces mounted in spaced apart relation at an upper portion of each of said first and second types of outer door members, each of said fastening pieces extending away from said first and second types of outer door members, respectively, and two locking members mounted to said inner door member, each of said locking members including an engaging rod spring biased toward an engaging position in which it securely detachably retains one of said fastening pieces.

23. An automobile door assembly for use on a coupe type automobile, comprising:
   an inner door member adapted to be hingedly mounted to an automobile body;
   an interchangeable outer door member detachably mounted to said inner door member;
   securing means for detachably securing said interchangeable outer door member to said inner door member; and
   a window glass mounted to an upper portion of said interchangeable outer door member;
   wherein said securing means comprises hinge means for pivotally mounting said outer door member to said inner door member, and locking means for locking said outer door member against pivotal movement relative to said inner door member;
   wherein said hinge means comprises two engaging members mounted to said inner door member in spaced apart relation at a lower portion thereof, and a pair of fastening parts mounted to said outer door member in spaced apart relation at a lower portion thereof;
   wherein each of said engaging members comprises an L-shaped member having a C-shaped part at one end thereof, said C-shaped part having a notch therein opening away from said inner door member; and
   wherein each of said fastening parts comprises a fastening plate mounted to said outer door member at an angle thereto such that said outer door member must be angled relative to said inner door member in order to engage said fastening plates in said notches of said C-shaped parts of said engaging members, respectively.

24. An automobile door assembly for use on a coupe type automobile, comprising:
   an inner door member adapted to be hingedly mounted to an automobile body;
   an interchangeable outer door member detachably mounted to said inner door member;
   securing means for detachably securing said interchangeable outer door member to said inner door member; and
   a window glass mounted to an upper portion of said interchangeable outer door member;
   wherein said securing means comprises hinge means for pivotally mounting said outer door member to said inner door member, and locking means for locking said outer door member against pivotal movement relative to said inner door member; and
   wherein said locking means comprises two fastening pieces mounted in spaced apart relation at an upper portion of said outer door member, each of said fastening pieces extending away from said outer door member, and two locking members mounted to said inner door member, each of said locking members including an engaging rod spring biased toward an engaging position in which it securely detachably retains one of said fastening pieces.

25. An automobile door assembly as recited in claim 24, further comprising
   a window glass raising/lowering means, adapted to be mounted to said inner door member and to be operably connected to said window glass, for raising and lowering said window glass.

26. An automobile door assembly as recited in claim 25, further comprising
   said securing means comprises:
   hinge means, for pivotally mounting said outer door member to said inner door member; and
   locking means for locking said outer door member against pivotal movement relative to said inner door member.

* * * * *